United States Patent [19]

Kogge

[11] Patent Number: 5,475,856
[45] Date of Patent: Dec. 12, 1995

[54] DYNAMIC MULTI-MODE PARALLEL PROCESSING ARRAY

[75] Inventor: Peter M. Kogge, Endicott, N.Y.

[73] Assignee: International Business Machines Corporation, Armonk, N.Y.

[21] Appl. No.: 324,295

[22] Filed: Oct. 17, 1994

Related U.S. Application Data

[63] Continuation of Ser. No. 798,788, Nov. 27, 1991, abandoned.

[51] Int. Cl.⁶ ..................................................... G06F 13/00
[52] U.S. Cl. ...................... 395/800; 395/375; 395/250; 364/131; 364/133; 364/141; 364/228; 364/228.3; 364/228.7; 364/228.8; 364/228.9; 364/229.2; 364/231.9; 364/232.21; 364/232.9; 364/DIG. 1
[58] Field of Search ................................... 395/800, 250, 395/375; 364/DIG. 1, 228.3, 228.7, 228.9, 229.2, 231.9, 232.21, 232.9, 131, 132, 141

[56] References Cited

U.S. PATENT DOCUMENTS

| | | | |
|---|---|---|---|
| 4,873,626 | 10/1989 | Gifford | 395/800 |
| 4,891,787 | 1/1990 | Gifford | 364/900 |
| 4,916,652 | 4/1990 | Schwarz | 364/748 |
| 4,992,933 | 2/1991 | Taylor | 364/200 |
| 5,008,882 | 4/1991 | Peterson et al. | 370/94.3 |
| 5,010,477 | 4/1991 | Omoda et al. | 395/800 |
| 5,165,023 | 11/1992 | Gifford | 395/325 |
| 5,212,777 | 5/1993 | Gove et al. | 395/375 |
| 5,230,079 | 7/1993 | Grondalski | 395/800 |
| 5,239,629 | 8/1993 | Miller et al. | 395/325 |

OTHER PUBLICATIONS

T. B. Berg and H. J. Siegel, "Instruction Execution Trade-Offs for SIMD vs. MIND vs. Mixed Mode Parallelism", Proceedings of the 5th Int'l. Parallel Processing Symposium, pp. 301–308, Apr. 30, 1991.
Book entitled: "The Architecture of Pipelined Computers" by Peter M. Kogge.
Nichols et al. "Data management and control flow constructs in a SIMD/SPMD parallel language/compiler," IEEE Feb. 1990, pp. 397–406.
Lipovski, "SIMD and MIMD processing in the Texas reconfigurable array computer", IEEE Feb. 1988, pp. 268–271.
Raghavan et al. "Fine grain parrallel processors and real–time applications: MIMD controller/SIMD array", IEEE May, 1990, pp. 324–331.

*Primary Examiner*—Alyssa H. Bowler
*Assistant Examiner*—Dzung C. Nguyen
*Attorney, Agent, or Firm*—Lynn L. Augspurger; Andrew M. Riddles

[57] ABSTRACT

A Parallel RISC computer system is provided by a multi-mode dynamic multi-mode parallel processor array with one embodiment illustrating a tightly coupled VLSI embodiment with an architecture which can be extended to more widely placed processing elements through the interconnection network which couples multiple processors capable of MIMD mode processing to one another with broadcast of instructions to selected groups of units controlled by a controlling processor. The coupling of the processing elements logic enables dynamic mode assignment and dynamic mode switching, allowing processors operating in a SIMD mode to make maximum memory and cycle time usage. On and instruction by instruction level basis, modes can be switched from SIMD to MIMD, and even into SISD mode on the controlling processor for inherently sequential computation allowing a programmer or complier to build a program for the computer system which uses the optimal kind of parallelism (SISD, SIMD, MIMD). Furthermore, this execution, particularly in the SIMD mode, can be set up for running applications at the limit of memory cycle time. With the ALLNODE switch and alternatives paths a system can be dynamically achieved in a few cycles for many many processors. Each processing element and memory and has MIMD capability the processor's an instruction register, condition register and program counter provide common resources which are used in MIMD and SIMD. The program counter become a base register in SIMD mode.

37 Claims, 5 Drawing Sheets

DYNAMIC MULTI-MODE PARALLEL PROCESSING ARRAY

This application is a continuation of application Ser. No. 07/798,788, filed Nov. 27, 1991 now abandoned.

FIELD OF THE INVENTIONS

The field of the inventions described is computer systems, and the inventions relate particularly to computer systems which can implement dynamically multi-modes of processing utilizing an array of processors to execute programs in parallel within the array of processing elements.

CROSS REFERENCE TO RELATED APPLICATIONS

The present application related to:

"Broadcast/Switching Apparatus For Executing Broadcast/Multi-Cast" by H. T. Olnowich et al U.S. Ser. No. 07/748,316, filed Aug. 21, 1991 (IBM Docket EN991030A)

"Multi-Sender/Switching Apparatus For Status Reporting Over Unbuffered Asynchronous Multi-Stage Networks" by H. W. Olnowich et al U.S. Ser. No. 07/748,302, filed Aug. 21, 1991 (IBM Docket EN991030B)

"Sync-Net - A Barrier Synchronization Apparatus For Multi-Stage Networks" by P. L. Childs et al U.S. Ser. No. 07/748,303, filed Aug. 21, 1991 (IBM Docket EN991049)

"GVT-Net -A Global Virtual Time Calculation Apparatus For Multi-Stage Networks" by P. L. Childs et al U.S. Ser. No. 07/748,295, filed Aug. 21, 1991 (IBM Docket EN991050) issued Oct. 5, 1993, as U.S. Pat. No. 5,250,943 and in addition, those concurrently herewith as related applications:

"Priority Broadcast And Multi-Cast For Unbuffered Multi-Stage Networks" by H. T. Olnowich et al U.S. Ser. No. 07/799,262, filed Nov. 27, 1991 (IBM Docket EN991016B)

The "Dual Priority Switching Apparatus for Simplex Networks" with H. T. Olnowich, P. Kogge et al U.S. Ser. No. 07/800,652, filed Nov. 27, 1991 IBM Docket EN991016A)

"Multi-Function Network" by H. T. Olnowich et al U.S. Ser. No. 07/799,497, filed Nov. 27, 1991 (IBM Docket EN991017)

"Multi-Media Serial Line Switching Adapter for Parallel Networks and Heterogeneous and Homologous Computer System", H. T. Olnowich, U.S. Ser. No. 07/799,602, filed Nov. 27, 1991 (IBM Docket EN991119)

These co-pending applications and the present application are owned by one and the same assignee, namely, International Business Machines Corporation of Armonk, N.Y.

The descriptions set forth in these co-pending applications are hereby incorporated into the present application by this reference.

BACKGROUND OF THE INVENTIONS

Computer systems which can use an array of processors which can execute programs in parallel have been developed.

VLSI technology can now place multiple processors (each with its own memory) on either a single chip or multiple chips in very close proximity. Such parallel arrays of processors can be configured into either Single Instruction Steam Multiple Data Stream (SIMD), or Multiple Instruction Stream Multiple Data Stream (MIMD), or Single Instruction Stream Single Data Stream (SISD) configurations, but to date, neither multiple types of modes have been employed, and there has been no machine which has provided a form where the mode can be changed dynamically and efficiently during program execution.

Some of the work appears to have be based in part on my book entitled "The Architecture of Pipelined Computers", published by Hemisphere Publishing Corporation in 1981 under ISBN 0-89116-494-4. This work has an historical perspective which still is useful after a decade of progress in the field, see pages 11–20.

There continue to be developments in the field of different mode oriented machines. For example for the SIMD mode, recently U.S. Pat. No. 4,992,933 entitled SIMD ARRAY PROCESSOR WITH GLOBAL INSTRUCTION CONTROL AND REPROGRAMMABLE INSTRUCTION DECODER issued on Feb. 12, 1991 to James L. Taylor with respect to an array processor which provided a multi-dimensional array of processing elements and which provided a mechanism where the processing elements may be simultaneously updated in a SIMD fashion in response to a global load instruction which forces an interrupt to all processing elements.

Most advanced machines today are MIMD. U.S. Pat. No. 4,916,652 issued to Schwarz and Vassiliadis on Apr. 10, 1990 and entitled DYNAMIC MULTIPLE INSTRUCTION STREAM MULTIPLE DATA MULTIPLE PIPELINE APPARATUS FOR FLOATING POINT SINGLE INSTRUCTION STREAM SINGLE DATA ARCHITECTURES addresses implementing a MIMD machine via multiple functional pipelines, and interleaving the different instruction streams into these pipelines. This patent contemplated switching the machine from MIMD to SISD for a shod period of time to handle some complex instruction for floating point operation.

There are others which have interrupted the MIMD mode of a machine. U.S. Pat. No. 4,873,626 issued Oct. 10, 1989 and U.S. Pat. No. 4,891,787 issued Jan. 2, 1990, both to David K. Gifford, describe a Parallel MIMD processing system with a processor array having a SIMD/MIMD instruction processing system. These two patents define a single CPU that is an overall controller to multiple groups of processors (PEs) and memories, where each group has an interconnection path of some sort. A parallel bus interconnects the master CPU to the groups. This machine has proved that all PEs can be running independant program code in MIMD fashion. Like the other above patent there is the capability of interrupting the processing of the PEs which are controlled by the single Master Control Processor.

Currently, most SIMD processors (e.g. the Connection Machine CM-2) are either stand alone units, or operate as a front end or back end of an MIMD mainframe. Each processor is established to perform a specific function, and schemes like those which require interrupts require a substantial amount of overhead to perform limited specialized mode operations. However, most computer algorithms or programs may have some strong match to efficient parallel execution in one of several modes (SIMD or MIMD). Furthermore, virtually all algorithms would benefit from a machine architecture that permitted different modes of execution for different pads of a problem. The existing proposals have not adequately addressed this need.

SUMMARY OF THE INVENTION

The inventions which are described herein enable a machine architecture permits different modes of execution for different pads of a problem. In addition, the machines use the same set of system resources to enable multimode applications. The computer system which I have described is a multi-processor computer system having multiple groups of processors (processing elements) and memories, where processors are intercoupled via an interconnection path, and operating means for controlling the execution of instructions by the processors of the system. In accordance with the preferred embodiment the processors can be configured to execute instructions in the SIMD and/or MIMD mode dynamically. This change of mode can be on an instruction by instruction basis. The processors can be physically identical and yet perform multi-mode functions.

In my preferred embodiment each computer processing element will have at a minimum an instruction register, a program counter, and a condition code register. With the described architecture, I have provided controls which enable these resources of common processing elements which are necessary in MIMD mode operations, to be used and useful in SIMD. The dynamic switching aspect of my invention utilizes the instruction register of a computer processing element to directly control instruction processing utilizing other common elements as dual purpose resources in the SIMD mode of operation.

Accordingly, I have provided that the program counter is assigned a base register function.

I have also provided that the condition code register is assigned a local enable function.

I have also provided that the instruction register is utilized to pipeline SIMD instructions.

Each of the processors have a value in the instruction register which is utilized for dynamically indicating the mode of operation set for execution of the current instruction. An instruction in the instruction set can be broadcast to selected processors of the system to dynamically switch the selected set of processors of the system to a desired mode of operation.

In my preferred embodiment there is provided a path between the instructions registers of each processing elements of a group of processors executing a stream of instructions, enabling SIMD operations in a plurality of processors of the group by broadcast over the broadcast path so provided.

In an alternative embodiment an interconnection network can perform the broadcast functions between processors. In this embodiment, which can be combined with a direct broadcast path between processors, a multi-stage interconnection network provides alternative paths to the instruction registers. This alternative interconnection network is a dynamic multi-stage two sided switching network enabling point to point coupling of processors without blocking.

In addition, there can be several inter-dynamic groups of processing modes operating on the same computer system dynamically. No known system allows such a configuration.

These and other improvements, illustrating all the architectural approaches, are set forth in the following detailed description. For a better understanding of the inventions, together with advantages and features, reference may be made to the co-pending applications for other developments referenced above. However, specifically as to the improvements, advantages and features described herein, reference will be made in the description which follows and to the below-described drawings.

(Note: For convenience of illustration, FIGURES may be separated in pads and as a convention we place the top of the FIGURE as the first sheet, with subsequent sheets proceeding down and across when viewing the FIGURE, in the event that multiple sheets are used.)

Our detailed description follows as pads explaining our preferred embodiments of our inventions provided by way of example.

DETAILED DESCRIPTION OF THE INVENTIONS

Figure 1A:
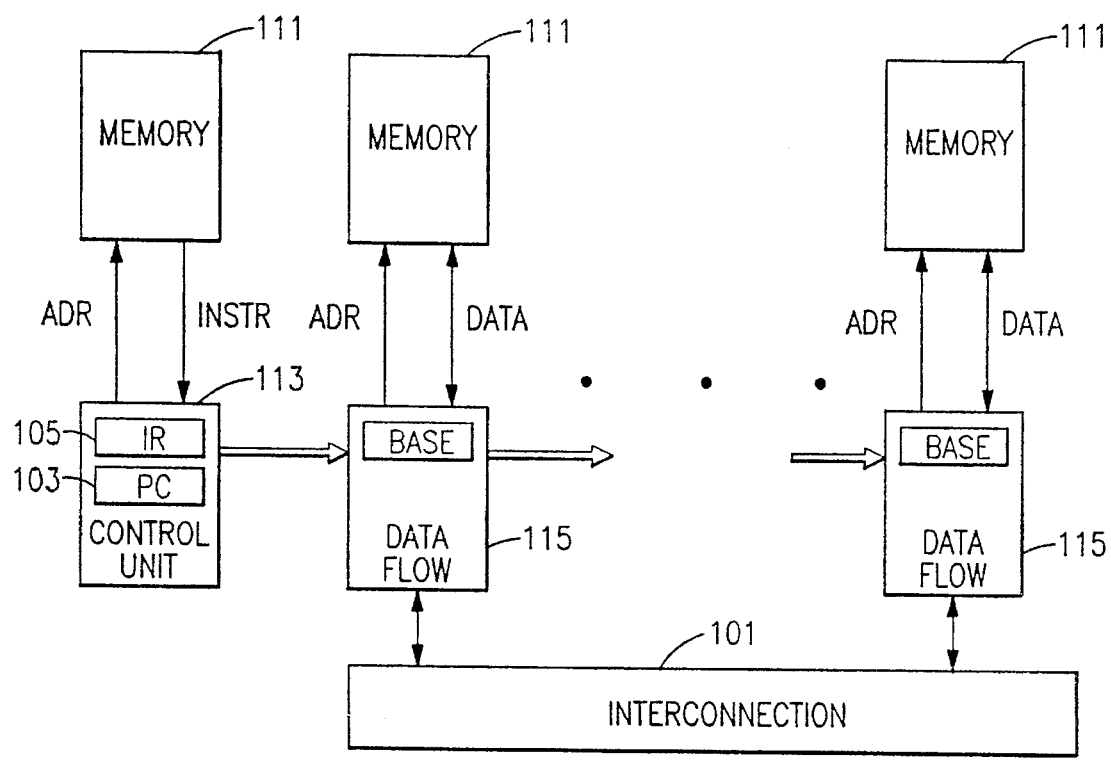
FIG. 1(a) illustrates the SIMD mode organization of the common resource system.
Figure 1B:
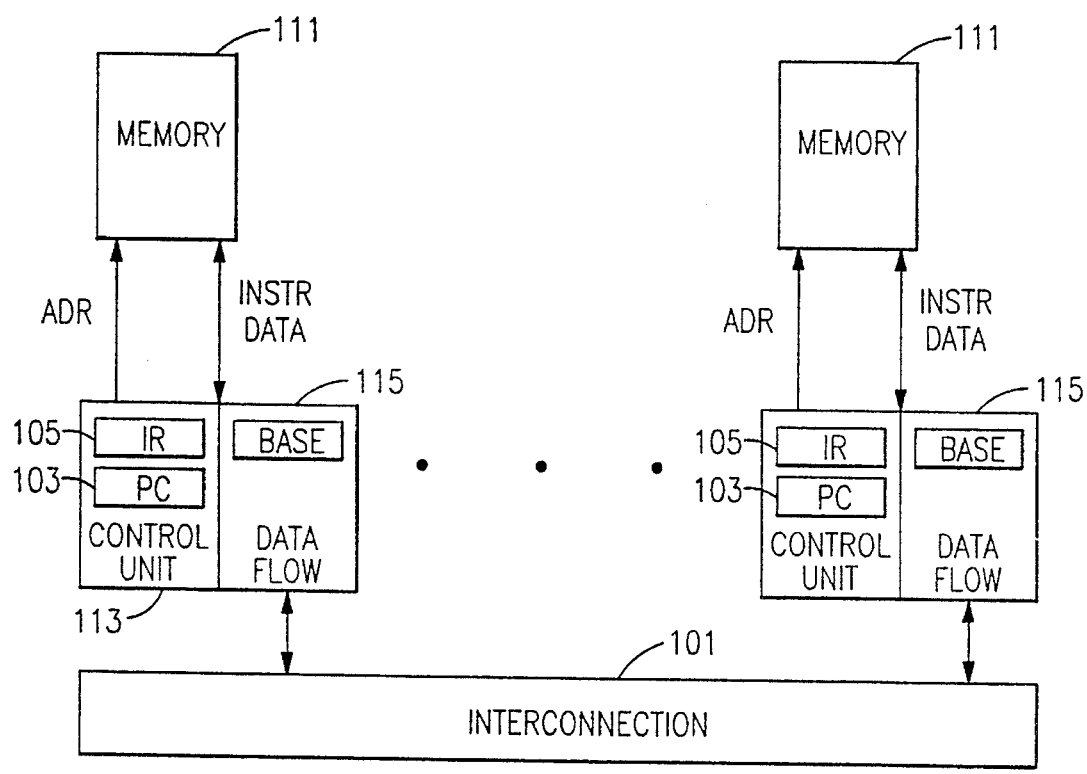
FIG. 1(b) illustrates the MIMD mode organization of the common resource system.

In accordance with my inventions, the computer system and its architecture which will be described enable a machine processing element to execute with the same resources different pads of a problem in an appropriate mode, for example the SIMD mode of FIG. 1(a) or the MIMD mode of FIG. 1(b). In addition within the meaning of the FIG. 1(a) is SISD, as will be described. In my preferred embodiment, the machines use the same set of system resources to enable multi-mode applications but these resources are dynamically reconfigured. The computer system which I have described is a multi-processor computer system having multiple groups of processors 1 . . . N. The processing elements have (in the preferred RISC configuration) a control unit, a data flow unit, and a memory. The processors are intercoupled via an interconnection path 101, which can be any of the common forms of interconnection networks, such a a crossbar, or a circuit switching network, a binary hypercube or other connection network. In my preferred embodiment, as well as in my alternative embodiment, the best connection network for the purpose of the described architecture and accordingly, the one I prefer, is one of those based upon the ALLNODE switch described in the U.S. Patent Application entitled "Broadcast/Switching Apparatus For Executing Broadcast/Multi-Cast" by H. T. Olnowich et al U.S. Ser. No. 07/748,316, filed Aug. 21, 1991 (IBM Docket EN991030A), and which is a multi-stage network functioning as a parallel connection medium suitable for connecting RS/6000 and other processors together asynchronously, allowing processor nodes to be linked to each other with instructions sent at the same time or overlapped in any manner. The network is implemented in VLSI and provides a dynamic non-blocking via alternative path regular, equidistant within the chip, multistage two sided chip, with pods for connection to coupled processors, either within a chip, on a board, or over a communication path. The system can provide a dual priority scheme for simplex networks as described in the above referenced application of which I am an inventor. The related applications include those mentioned above which are incorporated herein by reference. This switch enables some of the features of my invention.

The computer processor will have those resources which are applicable for MIMD processing, including a program counter 103 which may be assigned base register function in the SIMD mode, a condition code register, which can be assigned a local enable function, and an instruction register 105 which is utilize in the SIMD mode to pipeline SIMD instructions.

The architecture which I describe provides operating means for controlling the execution of instructions by the processors of the system. In accordance with the preferred embodiment the processors can be configured to execute instructions in the SIMD and/or MIMD mode dynamically. This change of mode can be on an instruction by instruction basis. The processors can be physically identical and yet perform multi-mode functions.

Since, in my preferred embodiments the computer processing elements will have an instruction register 105, a program counter 103, and a condition code register, the computer system will have the controls which enable these resources of common processing elements which are necessary in MIMD mode operations, to be used and useful in SIMD.

Figure 2:
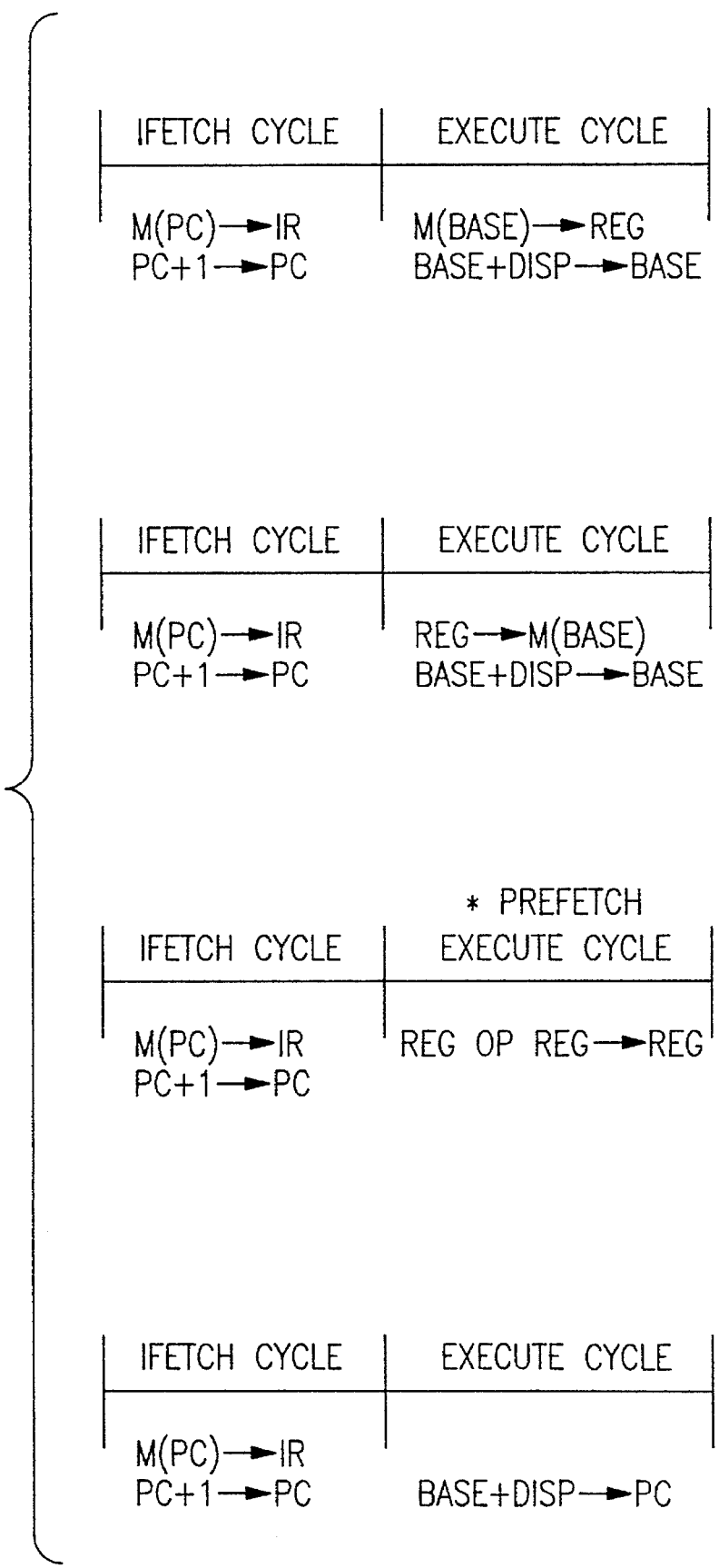
FIG. 2 shows by way of illustration an assumed timing of the operational resources of the system.

For the purpose of this discussion, we assume, as is my preferred embodiment, an individual processor will have the features summarized in FIG. 2. These features are characteristic of many possible RISC architectures, and they can be found in the RS/6000 RISC processors sold by International Business Machines Corporation, which I prefer to use. However, within the scope of the invention, the individual processing elements will have:

1. An instruction set where all memory references for data are performed via LOAD and STORE instructions, as is common in RISC-like instruction set architectures;

2. Addressing for such data accesses will be base plus displacement, but addition and index register updates should be applied after a memory operation has begun, as a post address update;

3. All instructions that perform computational operations, such as adds or subtracts, are register to register, and can execute in one or more execution cycles without need of memory references (which cycle time is illustrated in this disclosure as being an assumed one cycle time for the purpose of simplicity of exposition);

4. All instructions will fit in exactly one memory word, except for immediate instructions which take two (the second being data);

5. All instructions should fit in one machine cycle, with the address of the memory operand selectable from a machine register at the start of the cycle, and the register to receive results in a read capable of latching it in at the end of the cycle.

All of these features can be found in a typical RISC machine today, and they can be also implemented in more complex architectures with some of the advances which are currently being developed. The point here is that while I prefer the simplified RISC machines which is described in detail, there is nothing in this description of features that could not be modified to work with other more conventional architectures.

The architectural extensions.

The architectural extensions which enable the computer system to dynamically switch at the instruction by instruction level between SIMD (as an example) and MIMD modes will be described for two possible modes.

Figure 3:
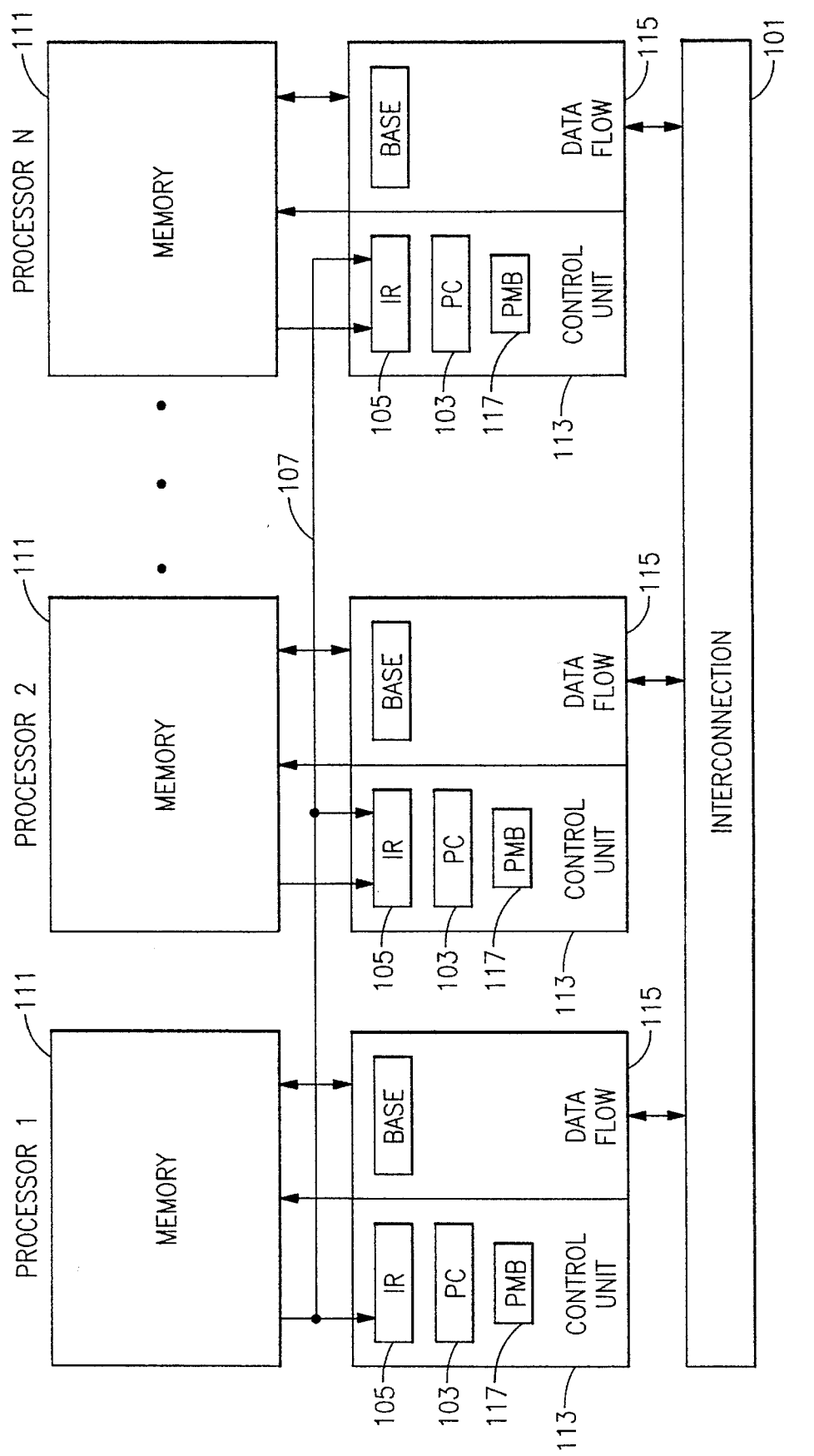
FIG. 3 illustrates new possible features of the system which includes a direct signal coupling across processing elements for broadcast in accordance with the preferred embodiment.

I assume a processor array configured generally in accordance with FIG. 3. The instruction word to enter each processor's instruction register 105 (IR) may come either from one broadcast over a global bus 107 (or in the alternative embodiment over the network 101) from the processor which is labelled as controlling (PE#1), or from the processor's own memory.

In accordance with my invention, each processor's instruction register 105 recognizes a new processing mode bit (PMB) 109 which indicates whether this processor in in the SIMD or MIMD mode. This bit controls where new instructions originate.

Also, the format of each instruction includes a separate parallel execution type bit (PET) which has two values, a value indicating "local" operation or "array" operation.

Finally, the system is provided with a "switch mode" instruction in the instruction set that flips the processing mode bit of the processors which execute switched mode instructions which follow the "switch mode" instruction in the instruction stream.

These architectural extensions can enable the dynamic switching between modes instruction by instruction, and enable the machines of the computer system to operate in the SIMD and/or MIMD mode as befits the needs of an algorithm which needs to be executed by the computer system.

Example of SIMD Mode operations

Each of the processors have a value in the instruction register which is utilized for dynamically indicating the mode of operation set for execution of the current instruction. An instruction in the instruction set can be broadcast to selected processors of the system to dynamically switch the selected set of processors of the system to a desired mode of operation. This example illustrates the SIMD operation.

At power up all but processor labeled PE#1 have their processing mode bit (PMB) set to SIMD. Processor #1 is set to MIMD and during the configuration cannot change from this MIMD mode.

In this mode, processor #1 functions as a controller for the system which is configured, and acts as a controller and fetches instructions. All other processors latch into their instruction registers a copy of each instruction as processor #1 fetches it. Thus at the end of the instruction fetch all processors have in their IR the same instruction for execution.

Now at the beginning of the next machine cycle each processor looks at both its PMB and the instruction's parallel execution type bit (PET) (as found in the IR). For processor #1 (which is in the MIMD mode), a PET of "local" causes the processor to decode and execute the instruction as a normal instruction. The next machine cycle is thus devoted to the instruction execution in processor #1, with its memory available for a load and store. It is possible that the machine design will permit prefetching and the instruction does not need memory, in which case this cycle may be a fetch of the next instruction. In the SIMD mode all other processors will see the "local" PET and ignore the instruction. They will go idle. This mode of operation is useful when some overall status or control operations needs to be done by the controlling processor. Whenever controlling processor #1 fetches another instruction the process is repeated and all processors in SIMD mode capture that memory reference in their instruction registers simultaneously.

In this SIMD mode configuration a PET of "array" causes all processors which are in SIMD mode (i.e. all but the controlling processor #1) to decode and execute the array instruction. The processor #1, however, will use the PET of "array" as a flag to skip its execution cycle and to proceed directly to the next instruction fetch. This overlaps fetch of the next instruction with execution by all the other processors which are SIMD mode selected (all those of the group of the array). Thus a string of "array" instructions would totally overlap all instruction fetches, allowing the processors' memories to be used for data operands at each of these cycles.

Execution of these SIMD array mode instructions proceeds exactly as they would for conventional processor execution, except that the processors' program counters PC are not automatically incremented after an instruction is executed, unless that instruction is a two word immediate instruction. This permits these SIMD machines to use their program counters as another base register. This is especially a valuable feature in any gate-limited design where the processors are all on a chip, where real estate is valuable and not to be wasted.

Instructions which now modify the program counter when it functions as a base register are:

1. A "Jump" instruction fetched by the controlling processor #1, but with PET set equal to "array" has the effect of setting each SIMD mode processor's program counter to that value;
2. A "Load Immediate" instruction fetched by the controlling processor, but with the PET set equal to "array" has the effect of loading each processor's register by the contents of that processor's memory, at the address specified by the processor's program counter, with a post fetch incrementation of the PC;
3. A "Branch and Link" instruction saves the slave's PC into the specified link registers, and reloads the PC with a new address, which is equivalent to saving a base and reloading it in the same instruction;
4. A "Return" instruction reloads the program counter base from one of the other registers.

Thus, together, these instructions permit the processor's PC to be used as pointers into arrays of constants and other data, as very useful in matrix operations.

It may be also convenient to include a "STORE IMMEDIATE" instruction in this architecture that is the inverse of the LOAD IMMEDIATE. Although not normally a useful instruction, in the context of the machine described, it allows the SIMD processors to use their program counters as base registers for stores as well.

Figure 5:
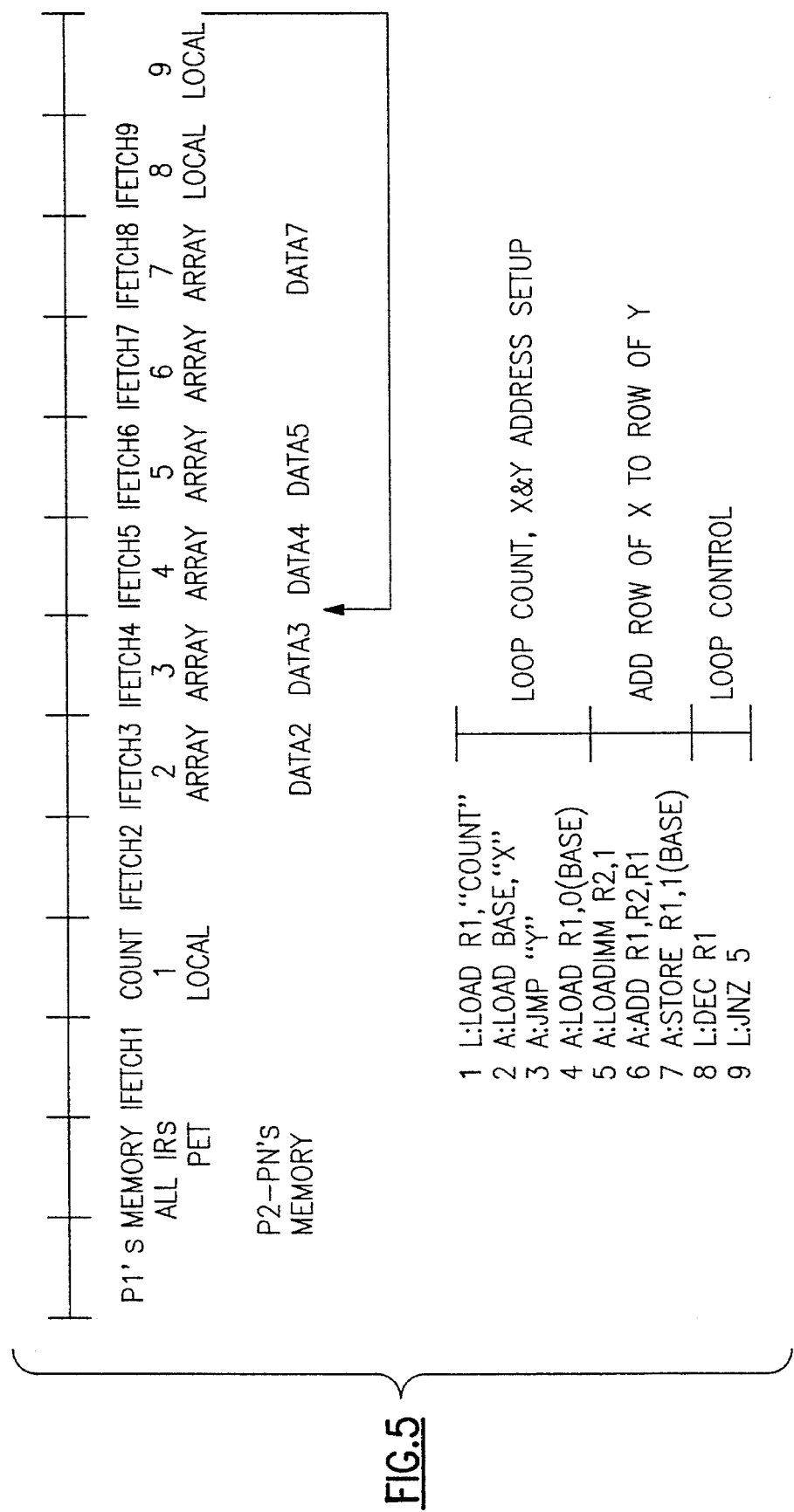
FIG. 5 illustrates SIMD timing in accordance with the preferred embodiment.

FIG. 5 diagrams a sample instruction stream. It will be noted that the inventions described in the SIMD mode allow for a very high memory utilization, as the array is doing something useful during a very high percentage of memory cycles, approaching 100% utilization.

FIG. 5 illustrates an example of a program which adds two sets of arrays together, where one array is found in each processing element. The top line has one subdivision per memory cycle, with an indication of what both the controlling PE (#1) and the SIMD mode PEs are accessing during that cycle.

The PET of each instruction in the IR is also shown on each cycle. Also, the simplified assembly language shown here is augmented by a "x:" at the beginning of each opcode. This is the PET bit for that instruction. An "x" of "A" indicates array mode; an "x" of "L" indicates local mode. The program shown here was chosen to demonstrate many of the novel features of this invention.

As illustrated in FIG. 5 the controlling processor starts execution with an instruction in local mode that sets up its own R1 register (an accumulator or general register such as is found in RISC-like machines) with a loop count. This takes two machine cycles, one for the instruction fetch and one for the operation. The other PEs are idle during this time.

Then, with a PET of array, it fetches and distributes an instruction "LOAD BASE,X" which causes a base register in each processing element in SIMD mode to be loaded with the address of the X array. This takes one machine cycle for the fetch, with the machine cycle in the SIMD PEs overlapped in a pipelined fashion with later cycles.

The next cycle sees the PE#1 again fetch and distribute an array mode instruction - in this case a "JUMP Y". This has the effect of having all PEs in SIMD mode load their PC with the starting address of the other array.

The next three instructions for the core of the loop, and all consume exactly one machine cycle from the PE#1 who fetches and distributes them. The first causes all SIMD-mode PEs to load one of their working registers R1 with a value from the X array. The second causes a similar load to R2 from the Y array. Note here that the "LOADIMM" instruction uses the PC (previously loaded with the Y array base address), and has the side effect of incrementing it by 1 (as is done with immediate mode instructions in conventional SISD machines). This advances the PC to the next Y array element. The final of the three instructions stores the result back in the location designated by the BASE register (the X array element position fetched at the first instruction), and then stores a modified address 1+BASE back into BASE. This adjusts BASE to point to the next X array element.

The final two instructions are local mode, and consist of a decrement of the loop count (found in the R1 of the PE#1) and a "Jump not Zero" back to the beginning of the loop. This latter jump, being executed in local mode affects only the PE#1's PC, leaving the SIMD mode PEs with a PC used as a pointer into the Y array. Alternative implementations of such a function, such as a BRANCH ON COUNT as found in IBM's System/370 machine architecture, could condense both of these instructions to a single one.

Example of MIMD mode.

While the structure and method of operations of the SIMD mode which have been described are useful in many applications, the MIMD mode is similarly very important. With this in mind I will give an example of MIMD operations.

Assume that the controlling processor #1 fetches a "switch mode" instruction which PET is "array". Processor 1 will ignore it. All SIMD mode processors will, however, execute it and change their modes to MIMD mode. Either this instruction can provide a program counter PC value to start execution at (permitting all processors to be started at the same place in the program at the same time) or the PC can be left at whatever it was before the instruction allowing each SIMD processor to have computed its own starting program address.

Once in the MIMD mode, a dynamic instruction by instruction level change, a processor then proceeds to fetch instructions as an individual processor, each on its own or as part of an array. Instructions whose PET is "local" execute the program stream strictly as if they were a normal computer. Instructions whose PET is "array" can operate in a variety of ways. One way of particular utility is when the instruction is a LOAD or a STORE in the RISC sense. In this case the address generated by the instruction is used as a processor address into the processor interconnection network. That processor stalls until the processor addressed by that address executes the opposite instruction (LOAD for a STORE and STORE for a LOAD) and the data from the STOREing processor passed to the LOADing processor. An advantage in the preferred ALLNODE switch network is that the latency of the network is minimized.

Similarly, a "switch mode" executed by a processor with a PMB value of "array" could perform in a variety of ways. The simplest might be simply switch into SIMD mode and wait for the next controlling processor #1 instruction that has a PET of "array". However, an attempt by the controlling processor to perform an equivalent switch might then stall until all other processors switch to into SIMD. But, using an alternative with some potentially valuable features can be implemented. This alternative would have processors other than controlling processor #1 stall when they encounter such an instruction, and use the address provided by the instruction as a key back to processor #1. When processor #1 executes a switch with an "address" which matches the key, the processor leaves the stall and resumes tracking the controlling processor's' instructions.

In this alternative, a useful key value would be a binary pattern which is logically ORed to some common bus signal which goes back to processor #1. When processor 1's address matches this ORed value the processors leave the stall and go back to the SIMD mode. This common bus signal could pass via the network. This permits a variable subset of processors to bounce out of MIMD mode into SIMD, and then potentially back to MIMD again within the group of original SIMD processors. Further, while one collection of processors are executing in SIMD mode, the others can remain in independent MIMD mode.

It is also possible to architect the switch mode instruction to provide its address to the interconnect network as the address of the processing element to serve as the controlling element, allowing any PE to be SIMD controller for any subset of other PEs, even chosen on a dynamic basis.

Thus the feature of sub-set groupings can be employed with or without the ALLNODE net features, but there are additional advantages to the ALLNODE net features which will be explained.

In addition, in an alternative embodiment, there can be several interdynamic groups of processing modes operating on the same computer system dynamically. With the features of the ALLNODE network, the broadcast functions can be passed with the interconnection network instead of on a global synchronous bus. Both could be implemented within the same features.

Example of ALLNODE interconnection network.

With the foregoing it will be appreciated that a desirable system can utilize the features like those shown and described in U.S. Ser. No. 07/661594 filed Nov. 13, 1990, entitled PARALLEL ASSOCIATIVE PROCESSOR SYSTEM, wherein there are a plurality of pickets which can implement SIMD processing, but in addition, this system can be employed with the more conventional MIMD concept with the same set of resources. Within the system, you can mix and match, with on a selective basis you can have both SIMD and MIMD operations, some processors running SIMD and others running MIMD. The pickets which can implement SIMD processing are disclosed in the application entitled "Parallel Associative Processor System" U.S. Ser. No.: 07/611,594 by J. W. Diffenderfer et al. filed Nov. 13, 1990, which is incorporated herein by reference.

With an ALLNODE interconnection network, a dynamic switching multi-stage network, wherein without-blocking via alternative path selection processors can be set up as part of an interconnected system quickly, you can select various groups of processors on a network which have desirable resources, and use them to run programs which can take advantage of the SIMD and MIMD needs of the application. With this the designation of a controlling processor need not be limited to one controlling processor, which offers the opportunity to dynamically rotate who the controller is. If the selected network selects which groups to interconnect, and those selected become pad of a dynamic network, you can use the network to broadcast instructions. This allows not necessarily the hardware but related software to control who the route processor is.

This is more more versatile and perhaps offers up some more features than a other interconnection networks which could be employed. With such a system you now have a system that can run a SIMD mode from anybody (any processor of the selected system). One processor could be the controlling party for a period of time, and then another processor can become the controlling party, and between this dynamic resource allocation, different resources which are attached to the network can be utilized as determined by the fluidics and resources of the system. You can have multiple processors broadcast to multiple subsets of processors, and you can have multiple and arbitrary collections of SIMD machines running on the same physical hardware.

Figure 4:
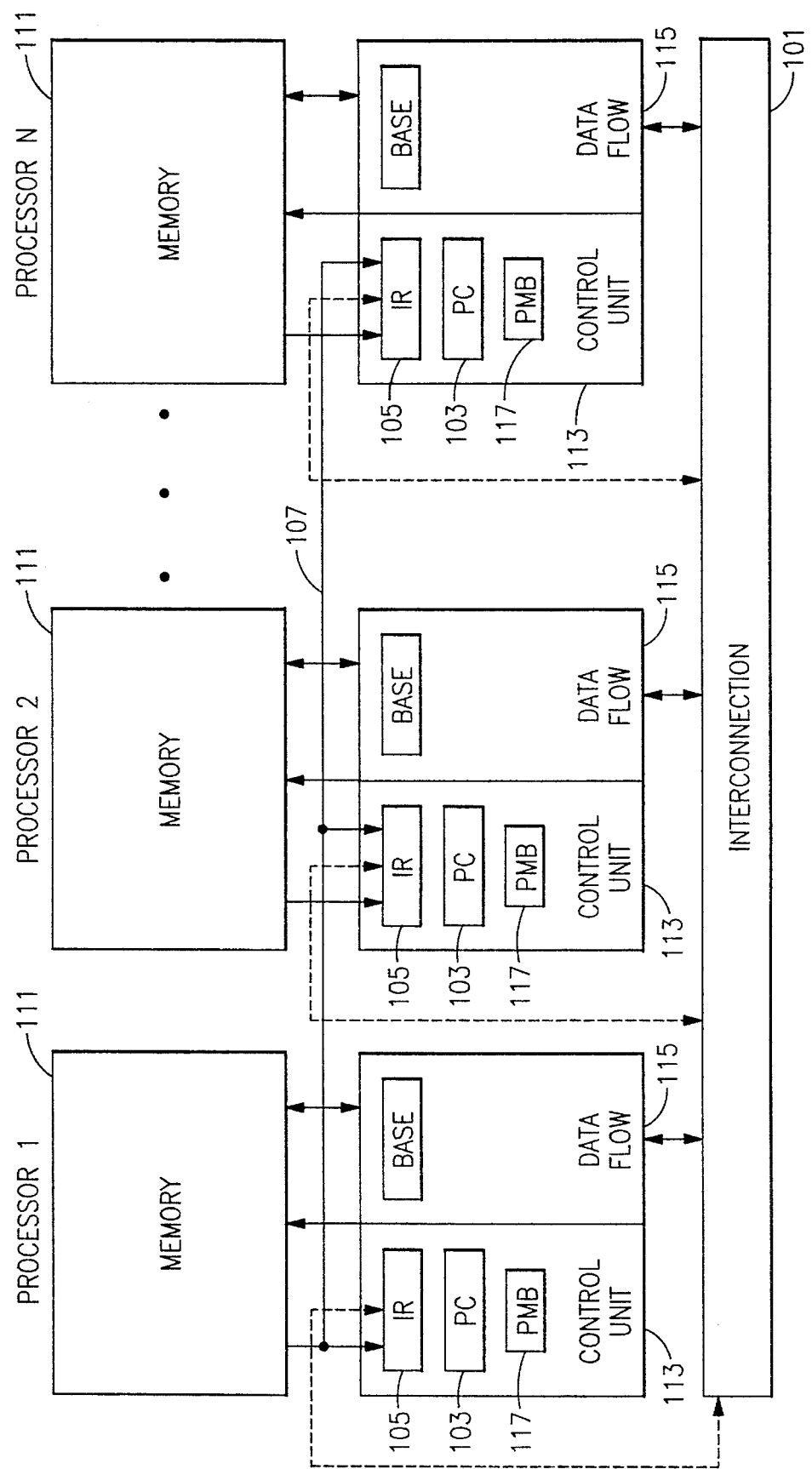
FIG. 4 illustrates an alternative embodiment of the system of FIG. 3 with broadcast being handled by the interconnection network utilizing the preferred Multi-Stage ALLNODE interconnection network providing alternative paths to the instruction registers.

In the MIMD mode, returning to FIG. 1, anyone of the processing elements could broadcast an instruction over to any other subset of processing elements. You can take that broadcast data into their instruction register and execute as in the SIMD mode. In FIG. 4, the interconnection network would broadcast the instructions, and the alternative path for synchronous communication into the instruction register is not needed to gain an additional path to the instruction register. In this alternative embodiment which uses the ALLNODE network (which is an asynchronous network) you would pass instructions through the interconnection network and go to the instruction registers internally, which enables use of more generalized machine elements at the trade off cost of a cycle, which may be absorbed usually, depending on needs. Basically, the broadcast through the network is probably as fast, and perhaps more reliable, than other alternatives. The selection of a direct alternative path as described in the preferred embodiment may be more desirable when the array with multiple processors is tightly coupled on a single chip. However, for applications of my system where processors are physically far apart, where each of the collection is running at a high frequency rate, a configuration which employs a fast asynchronous broadcast network such as the ALLNODE switch with broadcast capability is desirable. As shown in FIG. 4 the ALLNODE switch interconnection network can be employed as an alternative path into the instruction register from the network.

While pure and limited SIMD machines can fetch an instruction while they broadcast a prior instruction to other processing elements in an array, and some SIMD processors can use their memories independently, as in the PICKET processor described in U.S. Ser. No. 07/611,594 filed Nov. 13, 1990 in the application entitled Parallel Associative Processor System, the present architecture is an extension of the RISC capabilities. In a RISC processor, it is possible to fetch and instruction and then perform a memory operation. In the present system when a next instruction is fetched, every processor marked as participating in the operation is appropriately fetching or storing data for their individual memories. In fact every single instruction executed or fetched by the control unit designated as the control unit can trigger memory activity in each of the other processors.

Thus there is the potential for 100% usage of memory. When there is a need for memory it is available, and only when the program does not need it is when it is not used. Furthermore, in the present system, some of the processor can be operating in SIMD and others can be doing their own memory fetches in MIMD. This combines the capabilities of the PICKET concepts with the more conventional MIMD concepts, and utilizes the same set of resources in the process.

The ALLNODE switch make possible the use of more conventional processors for the system which is being described, and which is shown in FIG. 4. While some of the processors could utilize the common memory instruction communication path from the controlling processor 1, an alternative path (the dotted lines in FIG. 4) can be employed to interconnect common processors. These common processors can be PS/2s or RS/6000 machines with little modification. The modification employs a pod to provide an instruction and a status bit or value with appropriate decode logic which tells each processor whether to get their own instructions or wait for the broadcast from a controlling processor. Other than that the machines would not require physical change. The change would involve a pass that allows another processor to provide an instruction in lieu of the instruction that they would fetch themselves. That is provided via the alternative path into the instruction register. In this manner there is no need to tamper with the standard instruction register or much of the decode logic below it. By designating processors through the hard ALLNODE switch, dynamic rotation of which processor is the controlling party is possible, since this routing can be then done by software which would allow the software to control who the route processor is. With such a system, any processor of the system can run in the SIMD mode. One can be the controller for a period of time and then some other processor can be the controller. As stated, this allows multiple processors to broadcast multiple subsets, to provide multiple arbitrary collections of SIMD machines running on the same physical hardware, and with the same hardware, also run the normal MIMD processing.

In contrast with prior multiple mode proposals, among other differences, in the SIMD mode a distinguished PE does an instruction fetch which goes directly to every processor without special instructions, or interrupts. All the processing elements execute the instruction directly if that instruction is marked as being a parallel instruction, which we call setting the PET bit to "array". This by itself is similar to the broadcast mode common to SIMD processors, but with the new architecture, the same instruction stream can also perform local computations on the master or controlling processor. In addition, the PEs can be released back to independent MIMD mode via the dynamic "switch mode" instructions executed with the PET bit on.

It will be noted in the preferred embodiment, no interrupt mask bit indicates whether or not a PE will participate in a SIMD operation, but instead the PMB bit signals where the processing element will be getting its instructions from, whether from its local memory or that fetched by the controlling processor #1.

The simplicity of the current approach can be contrasted to the MIT originated U.S. Pat. Nos. 4,873,626 and 4,891,787, which in turn borrow from the classical solution to a parallel $IF_{13}$ THEN_ELSE conditional execution problem recognized in the ILLIAC IV processor proposed in the 1960s and implemented in the 1970s. There is an enabled bit in each processing element which permits each processing element to execute a SIMD instruction. In this situation all PEs perform an IF test in parallel on their own data, and set their ENABLE bit. Then all PEs which have their bit set to true conditionally execute the THEN code. Then all PEs which have their bit set to false conditionally execute the FALSE code. The result is seen by the controller, and both TRUE and FALSE codes are executed by the array.

However, the present system does not need an explicit ENABLED bit to perform this type of execution. The "Condition Code" or equivalent status bit that is already in each PE (since it is capable of independent operation) along with the COMPARE and equivalent instructions, provide the same facility if it is desired. However, because of the ability of the presently described system to dynamically switch rapidly from SIMD to MIMD, the present system offers a radical alternative to process and speed the result.

This process would cause all PEs to execute in the SIMD mode the IF test. Then the controller releases all of them with one instruction to MIMD mode. Each PE would then execute JUST THE ONE PATH that is relevant to its data. When all PEs have done their paths, they would switch back to SIMD mode.

The total time is thus the test time plus the maximum time of the two paths and not the sum as required by the classical approach. For complex code this improvement can approach a speed increase factor of two.

It will be considered that the preferred embodiment of my disclosure is ideally suited for tightly coupled very high performance RISC like processor architectures. But it can be extended to more widely placed architectures dependent upon the capabilities of the interconnection network. In the preferred embodiment the system would be implemented with dense VLSI where both memory and logic can be on one chip, thus permitting multiple PEs and their memories to be located on one chip. With such tight coupling the systems in relatively limited numbers on a single chip the SIMD mode of instruction execute can be implemented with the opportunity for one instruction per PE for each possible memory cycle.

The ability to switch rapidly to and from MIMD mode, and even into SISD mode on the controlling processor for inherently sequential computation allows a programmer or compiler to build a program for the computer system which uses the optimal kind of parallelism (SISD, SIMD, MIMD) whichever make the most Sense for the application. Furthermore, this execution, particularly in the SIMD mode, can be set up so that almost every single memory cycle time can be used in a computation, resulting in a machine design which is running at the memory limit. With the ALLNODE switch and alternatives paths the set up of a system can be achieved in a few cycles for many many processors. This system has a slight trade-off in cycle time during original set up, but the advantages of common hardware, extreme expansion capability, and flexibility of configuration may cause an alternative system which employs alternative paths through the interconnection network to be chosen as the system of choice.

Here the alternatives which have been elaborations show that the simple mechanisms which are defined for identifying the kind of execution is desired are quite economical to implement, and the can be grafted onto a wide variety of architectures or technologies. The approach allows the computer system to make very natural use of all the resources of the processing elements with little or no change in each processing element, creating "Parallel RISC" machines which operate in multi-modes and can be flexibly and dynamically configured to suit a particular application.

While I have described the preferred embodiments of my inventions, it will be understood that those skilled in the art, both now and in the future, upon the understanding of these discussions will make various improvements and enhancements thereto which fall within the scope of the claims which follow. These claims should be construed to maintain the proper protection for the inventions first disclosed.

What is claimed is:

1. A dynamic multi-mode parallel processing array, comprising:

a plurality of processors, each processor having a control unit for decoding and executing instructions of an instruction set, a data flow unit and a local memory, each of said control units having an instruction register, a program counter, a condition code register and a parallel mode bit (PMB), the PMB indicating whether the processor obtains instructions from a controlling processor or from said local memory;

an interconnection path between the instruction registers of the processors;

the instruction set having a plurality of instructions, each instruction having a parallel execution type bit (PET) that is used in conjunction with the PMB by the control unit to determine whether an instruction should be executed, the instruction set having a switch mode instruction for changing the PMB bit of a processor executing the instruction;

the processors organized into one or more groups, each group having a processor configured as the controlling processor, wherein any processor in the plurality of processors can be dynamically configured as the controlling processor, the controlling processor enabling the processors of a group to operate in a MIMD or SIMD mode, and to switch modes dynamically; and when a group of processors are operating in SIMD mode the controlling processor provides instructions to the instruction registers of the other processors in the group, each instruction provided via the interconnection path when the controlling processor fetches the instruction;

wherein a controlling processor of a group of processors fetches instructions, and wherein other processors in the group latch into their instruction registers each instruction as the controlling processor fetches it, such that at the end of the instruction fetch all other processors have in their instruction register the fetched instruction; and wherein the instruction set includes instructions which modify a processor's program counter to function as a base register, including one or more of the following instructions:

a "Jump" instruction which when executed in a processor operating in SIMD mode sets the processor's program counter to a value provide with the jump instruction; and a "Load Immediate" instruction which when executed in a processor operating in SIMD mode loads a register with the contents of the processors' local memory, at the address specified by the processor's program counter and then increments the program counter.

2. A dynamic multi-mode parallel processing array, comprising:

a plurality of processors, each processor having a control unit for decoding and executing instructions of an instruction set, a data flow unit and a local memory, each of said control units having an instruction register, a program counter, a condition code register and a parallel mode bit (PMB), the PMB indicating whether the processor obtains instructions from a controlling processor or from said local memory;

an interconnection path between the instruction registers of the processors;

the instruction set having a plurality of instructions, each instruction having a parallel execution type bit (PET) that is used in conjunction with the PMB by the control unit to determine whether an instruction should be executed, the instruction set having a switch mode instruction for changing the PMB bit of a processor executing the instruction;

the processors organized into one or more groups, each group having a processor configured as the controlling processor, wherein any processor in the plurality of processors can be dynamically configured as the controlling processor, the controlling processor enabling the processors of a group to operate in a MIMD or SIMD mode, and to switch modes dynamically; and when a group of processors are operating in SIMD mode the controlling processor provides instructions to the instruction registers of the other processors in the group, each instruction provided via the interconnection path when the controlling processor fetches the instruction;

wherein a group of processors operating in SIMD mode switch to MIMD mode when the controlling processor provides each processor in the group with the switch mode instruction whereby each processor begins fetching instructions from its local memory; and wherein the processors can communicate with each other using a load instruction to send and a store instruction to receive, said instructions containing an address which is used as a processor address on the interconnection path of the processor to communicate with, wherein the processor stalls until the communication takes place.

3. A dynamic multi-mode parallel processing array, comprising:

a plurality of processors, each processor having an control unit for decoding and executing instructions of an instruction set, a data flow unit and a local memory, each of said control units having an instruction register, a program counter, a condition code register and a parallel mode bit (PMB), the PMB indicating whether the processor obtains instructions from a controlling processor or from said local memory;

an interconnection path between the instruction registers of the processors;

the instruction set having a plurality of instructions, each instruction having a parallel execution type bit (PET) that is used in conjunction with the PMB by the control unit to determine whether an instruction should be executed, the instruction set having a switch mode instruction for changing the PMB bit of a processor executing the instruction;

the processors organized into one or more groups, each group having a processor configured as the controlling processor, wherein any processor in the plurality of processors can be dynamically configured as the controlling processor, the controlling processor enabling the processors of a group to operate in a MIMD or SIMD mode, and to switch modes dynamically; and when a group of processors are operating in SIMD mode the controlling processor provides instructions to the instruction registers of the other processors in the group, each instruction provided via the interconnection path when the controlling processor fetches the instruction;

wherein a group of processors operating in SIMD mode switch to MIMD mode when the controlling processor provides each processor in the group with the switch mode instruction whereby each processor begins fetching instructions from its local memory; and wherein a switch mode instruction executed by a first processor causes the first processor to stall and use an address provided by the switch mode instruction as a key back to the controlling processor, the controller processor can then execute a switch mode instruction with an "address" which matches the key, and causes the first processor to leave the stall and resume tracking the controlling processor's instructions.

4. A dynamic multi-mode parallel processing array, comprising:

a plurality of processors, each processor having a control unit able to decode and execute instructions of an instruction set, a data flow unit and a local memory, each control unit having an instruction register, a program counter, a condition code register and a parallel mode bit (PMB), the PMB indicating whether the processor obtains instructions from a controlling processor or from local memory;

an interconnection path between the instruction registers of the processors;

the instruction set having a plurality of instructions, each instruction having a parallel execution type bit (PET) that is used in conjunction with the PMB by the control unit to determine whether an instruction should be executed, the instruction set having a switch mode instruction for changing the PMB bit of a processor executing the instruction;

the processors organized into one or more groups, each group having a processor configured as the controlling processor, wherein any processor in the plurality of processors can be dynamically configured as the controlling processor, the controlling processor enabling the processors of a group to operate in a MIMD or SIMD mode, and to switch modes dynamically; and when a group of processors are operating in SIMD mode the controlling processor provides instructions to the instruction registers of the other processors in the group, each instruction provided via the interconnection path when the controlling processor fetches the instruction;

wherein a group of processors operating in SIMD mode switch to MIMD mode when the controlling processor provides each processor in the group with the switch mode instruction whereby each processor begins fetching instructions from its local memory; and wherein a variable subset of processors operating in MIMD mode execute switch mode instructions that cause the variable subset of processors to operate in SIMD mode while those processors that are not part of the variable subset continue operating in MIMD mode.

5. The array according to claim 4 wherein the variable subset of processors return to MIMD mode when the controlling processor provides each processor in the variable subset with the switch mode instruction.

6. A dynamic multi-mode parallel processing array, comprising:

a plurality of processors, each processor having a control unit for decoding and executing instructions of an instruction set, a data flow unit and a local memory, each of said control units having an instruction register, a program counter, a condition code register and a parallel mode bit (PMB), the PMB indicating whether the processor obtains instructions from a controlling processor or from said local memory;

an interconnection path between the instruction registers of the processors;

the instruction set having a plurality of instructions, each instruction having a parallel execution type bit (PET) that is used in conjunction with the PMB by the control unit to determine whether an instruction should be executed, the instruction set having a switch mode instruction for changing the PMB bit of a processor executing the instruction;

the processors organized into one or more groups, each group having a processor configured as the controlling processor, wherein any processor in the plurality of processors can be dynamically configured as the controlling processor, the controlling processor enabling the processors of a group to operate in a MIMD or SIMD mode, and to switch modes dynamically; and when a group of processors are operating in SIMD mode the controlling processor provides instructions to the instruction registers of the other processors in the group, each instruction provided via the interconnection path when the controlling processor fetches the instruction; and wherein the instruction set provides instructions where all memory references for data are performed via LOAD and STORE instructions, and where addressing for data accesses is a base plus displacement, and where addition and index register updates are applied after a memory operation has begun, as a post address update; and wherein all instructions that perform computational operations are register to register, and said processors execute instructions in one or more execution cycles without need of memory references.

7. A dynamic multi-mode parallel processing array, comprising:

a plurality of processors, each processor having a control unit for decoding and executing instructions of an instruction set, a data flow unit and a local memory, each of said control units having an instruction register, a program counter, a condition code register and a parallel mode bit (PMB), the PMB indicating whether the processor obtains instructions from a controlling processor or from said local memory;

an interconnection path between the instruction registers of the processors;

the instruction set having a plurality of instructions, each instruction having a parallel execution type bit (PET) that is used in conjunction with the PMB by the control unit to determine whether an instruction should be executed, the instruction set having a switch mode instruction for changing the PMB bit of a processor executing the instruction;

the processors organized into one or more groups, each group having a processor configured as the controlling processor, wherein any processor in the plurality of processors can be dynamically configured as the controlling processor, the controlling processor enabling the processors of a group to operate in a MIMD or SIMD mode, and to switch modes dynamically; and when a group of processors are operating in SIMD mode the controlling processor provides instructions to the instruction registers of the other processors in the group, each instruction provided via the interconnection path when the controlling processor fetches the instruction wherein a controlling processor of a group of processors fetches instructions, and wherein other processors in the group latch into their instruction registers each instruction as the controlling processor fetches it, such that at the end of the instruction fetch all other processors have in their instruction register the fetched instruction; and wherein after latching the fetched instruction each processor looks at its PMB and the PET obtained from the fetched instruction to determine whether to execute the fetched instruction, executing the fetched instruction accordingly.

8. The array according to claim 7 wherein while the processors are decoding and executing the fetched instruction the controlling processor begins fetching a next instruction.

9. The array according to claim 8 wherein the controlling processor of a group of processors fetches another instruction all processors in SIMD mode capture the memory reference in their instruction registers.

10. A dynamic multi-mode parallel processing array, comprising:

a plurality of processors, each processor having a control unit for decoding and executing instructions of an instruction set, a data flow unit and a local memory, each of said control units having an instruction register, a program counter, a condition code register and a parallel mode bit (PMB), the PMB indicating whether the processor obtains instructions from a controlling processor or from said local memory;

an interconnection path between the instruction registers of the processors;

the instruction set having a plurality of instructions, each instruction having a parallel execution type bit (PET) that is used in conjunction with the PMB by the control unit to determine whether an instruction should be executed, the instruction set having a switch mode instruction for changing the PMB bit of a processor executing the instruction;

the processors organized into one or more groups, each group having a processor configured as the controlling processor, wherein any processor in the plurality of processors can be dynamically configured as the controlling processor, the controlling processor enabling the processors of a group to operate in a MIMD or SIMD mode, and to switch modes dynamically on an instruction-by, instruction basis; and when a group of processors are operating in SIMD mode the controlling processor provides instructions to the instruction registers of the other processors in the group, each instruction provided via the interconnection path when the controlling processor fetches the instruction; and wherein the PMB indicates SIMD and MIMD modes and the PET indicates local and array operations of the associated processor.

11. The array according to claim 10 wherein when a group of processors are operating in SIMD mode, the program counters provide a base register function in the processors receiving instructions from the controlling processor.

12. The array according to claim 10 wherein when a group of processors are operating in SIMD mode, the condition code register provide a local enable function in the processors receiving instructions from the controlling processor.

13. The array according to claim 10 wherein there is provided a plurality of groups, with each group dynamically switching between modes of operation.

14. The array according to claim 10 wherein the interconnection path is a dynamic switching connection network.

15. The array according to claim 10 wherein the interconnection path provides a broadcast path between the instructions registers of each processor in a group of processors executing in SIMD mode.

16. The array according to claim 10 wherein the interconnection path is a multi-stage interconnection network that provides a broadcast path to the instruction registers of a group of processors operating in a SIMD mode.

17. The array according to claim 10 wherein a switch mode instruction provides a value to load into the program counter when executed.

18. The array according to claim 10 wherein the switch mode instruction does not change the program counter when executed.

19. The array according to claim 10 wherein a group of processors operating in SIMD mode switch to MIMD mode when the controlling processor provides each processor in the group with the switch mode instruction whereby each processor begins fetching instructions from its local memory.

20. The array according to claim 10 wherein the interconnection path is utilized to pass broadcast messages and to interconnect a variety of subsets of processors within a group of processors, such that the processors may implement on a selective basis both SIMD and MIMD operations, some processors running SIMD and others running MIMD.

21. The array according to claim 10 wherein is included for processor interconnection a dynamic switching multi-stage network, wherein without blocking via alternative path selection processors can be set up as part of an interconnected system permitting selection of various groups of processors on the network which have desirable resources, and use them to run programs which can take advantage of the SIMD and MIMD needs of the application.

22. The array according to claim 10 wherein the controlling processor is dynamically rotated through a group of processors so that each processor is configured as the controlling processor for one or more instructions.

23. The array according to claim 10 wherein the instructions registers of processors are interconnected via an asynchronous network enabling a controlling processor to pass instructions through the interconnection network to other processor instruction registers coupled via said network.

24. The array according to claim 10 wherein each processor is provided with a port through which passes the switch mode instruction.

25. The array according to claim 10 wherein the controlling processor can switch to SISD mode permitting a programmer or compiler to build a program for the array which uses any one or all modes of parallelism.

26. The array according to claim 10 wherein the interconnection path is a dynamic multi-stage two sided switching network enabling point to point coupling of processors without blocking.

27. The array according to claim 26 wherein the multi-stage interconnection network provides broadcast paths to the instruction registers of a group of processors operating in SIMD mode.

28. The array according to claim 10 wherein a multi-stage interconnection network provides an alternative path between the instruction registers of a group of processors operating in SIMD mode.

29. The array according to claim 28 wherein the multistage interconnection network a dynamic multi-stage two sided switching network enabling point to point coupling of processors without blocking.

30. The may according to claim 10 wherein a controlling processor of a group of processors fetches instructions, and wherein other processors in the group latch into their instruction registers each instruction as the controlling processor fetches it, such that at the end of the instruction fetch all other processors have in their instruction register the fetched instruction.

31. The array according to claim 30 wherein execution of SIMD mode instructions proceeds with the program counter used as a base register.

32. The array according to claim 30 wherein the instruction set includes instructions which when executed in a processor operating in SIMD mode uses the program counter as a base register, the instruction including a Load immediate instruction and a store immediate instruction.

33. The array according to claim 10 wherein each processor is a reduced instruction set computer (RISC).

34. The array according to claim 33 wherein the interconnection path is provided by an ALLNODE interconnection network.

35. The array according to claim 10 including:
- a first group of processors operating in SIMD mode having a first controlling processor providing instructions for said first group over the interconnection path; and
- a second group operating in SIMD mode having a second controlling processor providing instructions for the second group over the interconnection path.

36. The array according to claim 35 wherein the first controlling processor provides the switch mode instruction to the first group of processors causing the first group of processors to enter MIMD mode.

37. The array according to claim 36 wherein the second controlling processor provides the switch mode instruction to the second group of processors causing the second group of processors to enter MIMD mode.

\* \* \* \* \*